United States Patent [19]

Light

[11] Patent Number: 4,803,237

[45] Date of Patent: Feb. 7, 1989

[54] REINFORCED POLYESTER MOLDING COMPOSITIONS

[75] Inventor: Ronald R. Light, Kingsport, Tenn.

[73] Assignee: Eastman Kodak Company, Rochester, N.Y.

[21] Appl. No.: 158,822

[22] Filed: Feb. 22, 1988

[51] Int. Cl.$^4$ .................. C08K 5/05; C08L 67/02
[52] U.S. Cl. ..................... 524/385; 524/394; 524/513; 524/605
[58] Field of Search ................. 524/385, 394

[56] References Cited

U.S. PATENT DOCUMENTS

| | | | |
|---|---|---|---|
| 3,435,093 | 3/1969 | Cope | 260/857 |
| 4,223,113 | 9/1980 | Bier et al. | 525/439 |
| 4,223,125 | 9/1980 | Bier et al. | 528/305 |
| 4,352,904 | 10/1982 | Deyrup | 524/292 |
| 4,486,564 | 12/1984 | Deyrup | 524/308 |
| 4,506,043 | 3/1985 | Ogawa et al. | 524/394 |

Primary Examiner—John C. Bleutge
Assistant Examiner—David W. Woodward
Attorney, Agent, or Firm—John F. Stevens; William P. Heath, Jr.

[57] ABSTRACT

Disclosed are reinforced polyester molding compositions comprising poly(ethylene terephthalate), glass fibers, at least one sodium or potassium salt of a hydrocarbon carboxylic acid or an ionic hydrocarbon copolymer of an α-olefin, an α,β-ethylenically unsaturated carboxylic acid and a primary linear polymeric alcohol having the structure $CH_3(CH_2)_xCH_2OH$ where x has an average value of 28–48.

4 Claims, No Drawings

REINFORCED POLYESTER MOLDING COMPOSITIONS

TECHNICAL FIELD

This invention relates to reinforced polyester compositions which are moldable at low mold temperatures to form articles having improved surface smoothness.

BACKGROUND OF THE INVENTION

Efforts to produce an injection moldable, glass fiber reinforced poly(ethylene terephthalate) (PET) which can be molded using molds heated to temperatures less than the polymer's crystallization temperature from the glassy state have been difficult because of the polyester's slow crystallization rate. Combinations of specific nucleating agents with certain types of plasticizers enhance the crystallization kinetics of glass fiber reinforced PET (GFR-PET) to allow one to mold the composition in molds heated to temperatures to less than 110° C. Most of these plasticizers are monomeric, low molecular weight esters prepared by reacting a low molecular weight alcohol with an organic acid. However, many of these low molecular weight organic compounds are somewhat volatile at molding temperatures and tend to vaporize and redeposit on the mold surfaces.

It is the purpose of this invention to provide reinforced polyethylene terephthalate molding blends that can be molded into articles having a smooth, glossy surface, and which do not leave mold deposits and/or are not volatile during molding operations.

Copending application Ser. No. 158,821 filed on 02/22/88, relates to reinforced poly(1,4-cyclohexylene dimethylene terephthalate) containing a primary, linear polymeric alcohol as a crystallization aid.

The following U.S. patents are of interest: U.S. Pat. Nos. 3,435,093, 4,352,904, 4,486,564, 4,223,125 and 4,223,113. While these patents reveal the use of salts of a selected organic polymer containing pendant carboxyl groups in combination with low molecular weight esters, ketones, sulfoxides, nitriles or amides, none suggest the use of a primary, linear polymeric alcohol as described herein as an additive that could be used to enhance the crystallization rate of GFR-PET to result in improved surface smoothness of molded objects.

DESCRIPTION OF THE INVENTION

According to the present invention, there are provided reinforced polyester molding compositions comprising (a) poly(ethylene terephthalate) having an I.V. of about 0.4–1.0 dl/g, (b) about 10–60% by weight of the composition of glass fibers, (c) about 1.0–5.0% by weight of the composition of at least one sodium or potassium salt of a hydrocarbon carboxylic acid of 7–25 carbon atoms or at least one sodium or potassium salt of an ionic hydrocarbon copolymer of an $\alpha$-olefin of 2–5 carbon atoms and an $\alpha,\beta$-ethylenically unsaturated carboxylic acid of 3–5 carbon atoms in which the carboxyl groups have been at least partially neutralized with $Na^+$ or $K^+$ cations, and (d) about 0.5–10% by weight of the composition of a primary linear polymeric alcohol having the structure $CH_3(CH_2)_xCH_2OH$ where x has an average value of 28–48.

The polyethylene terephthalate employed herein has an inherent viscosity of at least 0.4 dl/g. The polyethylene terephthalate preferably has an upper limit on inherent viscosity of about 1.0. The polyethylene terephthalate can contain up to about 5 mol % of other comonomers such as diethylene glycol, glutaric acid, polybutylene terephthalate, polyalkylene oxide, cyclohexane dimethanol, and other diols.

The glass fiber reinforcement concentration used in this invention can vary from about 10 wt. % to about 60 wt. % but more preferably from about 10 wt. % to about 55 wt. %. The glass fibers may be conventional, commercially available fibers having a length of about ⅛–2 inches and a diameter of about 5–50 microns. In addition to the glass fibers, the composition of this invention may also contain other fillers and additives such as mica, talc, flame retardants, stabilizers, and other processing aids and colorants.

Representative acids for the sodium or potassium salts of a hydrocarbon carboxylic acid are stearic, pelargonic and behenic acids. Representatives of the ionic hydrocarbon copolymer are the salts of copolymers of olefins and acrylic or methacrylic acids, or copolymers of aromatic olefins and maleic anhydride. Preferably these materials include the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology. The sodium or potassium salts are used in amounts of about 1–5% based on the total composition weight.

The primary linear alcohols used in the compositions of this invention as a crystallization aid are commercially available. An example is Unilin alcohol sold by Petrolite Corporation, having a molecular weight of 425. These polymeric alcohols have the general structure described above and have carbon chain lengths from C30 up to C50. The alcohols should have an average molecular weight such that the volatility is low enough to prevent difficulties in drying the polyester composition. On the other hand, if the average molecular weight of the alcohol is too high, compatibility problems may exist between the polyester and the alcohol resulting in a two-phase system. These polymeric alcohols have melting points which vary from 88° C. to 110° C., depending on the molecular weight. The desired concentration level can vary from 0.5 wt. % to about 10 wt. % but more preferably from about 1.0 wt. % to 5.0 wt. %.

In addition, the compositions of this invention may contain additives commonly employed with polyester resins, such as mold release agents, antioxidants, tougheners and nucleating agents.

The compositions of this invention are prepared by blending the components together by any convenient means to obtain an intimate blend. Neither temperature nor pressure are critical. For example, the polyethylene terephthalate can be mixed dry in any suitable blender or tumbler with the other components and the mixture melt-extruded. The extrudate can be chopped. If desired the reinforcing or filling agent can be omitted initially and added after the first melt extrusion, and the resulting mixture can then be melt extruded.

The following examples are submitted for a better understanding of the invention.

EXAMPLE 1 (Control)

Dried poly(ethylene terephthalate) having an inherent viscosity of about 0.62 was mixed with 30 wt. % (based on the total composition weight) ½-in. glass fibers, 5% based on total composition weight ethylene/methacrylic acid copolymer (90/10 by weight) which had been 80% neutralized with Na, 1.0% based on total composition weight of a phenoxy resin (stabilizer) and 0.5% based on total composition weight of Irganox 1010 phenolic antioxidant. The mixture was then extrusion compounded on a 1 and ½-in. single screw extruder at a temperature of about 265° C. and chopped into pellets. The composition was redried at about 150° C. for about 4 hrs. and tensile bars molded on a BOY 50S injection molding machine at a set temperature of 275° C. The surface temperature of the mold was measured to be 95° C. Differential scanning calorimetry and surface texture measurements were made on the molded tensile bars. Surface texture was measured in several places the length of a tensile bar using the Ra (arithmetic mean) version of the SURTRONIC 10 surface instrument manufactured by Rank Taylor Hobson Limited of Leicester, England and averaged. The material exhibited a Tg of about 74° C., a Tch of about 116° C. and an average surface roughness of about 33 micro-inches.

EXAMPLE 2

A PET composition, as described in Example 1, was blended with 1 wt. % UNILIN 425 alcohol (average molecular weight of 425), compounded and molded in the same manner. Again the glass transition temperature (Tg) and crystallization temperature on heating (Tch) and surface texture were measured on the molded bars. Surprisingly, it was observed that the Tg and Tch as determined by the DSC were essentially unchanged (Tg=75° C. and Tch=117° C.), but the tensile bar surface texture (smoothness and gloss) was greatly improved. The surface roughness was observed to be about 12 micro-inches. This was totally surprising since the art teaches that in order for one to obtain smooth parts at mold temperatures less than 110° C., one must use a low molecular weight plasticizer, such as an organic ester, ketone, sulfone, sulfoxide, nitrile or amide which will lower, especially, the Tch and additional 4° C. This was accomplished without deleteriously affecting other mechanical properties.

EXAMPLE 3

PET, as described in Example 1, was blended with 3 wt. % UNILIN 425 alcohol, compounded and molded in the same manner. The Tg, Tch and surface roughness were measured again on molded bars. Unexpectedly, it was observed that the Tg and Tch were essentially unchanged but yet the surface texture was observed to be very smooth and glossy. The Tg was found to be at about 72° C. and the Tch at about 114° C. The average surface roughness along the smooth tensile bars was measured to be about 10 micro-inches.

EXAMPLE 4

A PET composition, as described in Example 1 above, was blended with 5 wt. % UNILIN 425 alcohol, compounded and molded in the same manner. Again, the Tg, Tch and surface roughness were measured on molded bars. Surprisingly, again the Tg and Tch essentially remained unchanged while the surface roughness was greatly improved. The Tg was observed to be about 79° C. and Tch at about 115° C. The surface roughness was measured to be about 11 micro-inches. This was totally unexpected since prior art teaches that the Tch needs to be reduced about 4 to 5 degrees in order to allow one to mold smooth parts in molds heated to temperatures less than 110° C. This was accomplished without deleteriously affecting other mechanical properties.

As used herein, the inherent viscosity (I.V.) is measured at 25° C. using 0.50 g of polymer per 100 mL of a solvent consisting of 60% by weight phenol and 40% by weight tetrachloroethane.

Surface smoothness is measured by taking several measurements along the length of the tensile bars using the Ra (arithmetic mean) version of a Surtronic 10 surface instrument manufactured by Tank Taylor Hobson Limited of Leicester, England. Surface smoothness is indicated in micro-inches, and is a conventional measurement of variations in the surface in a direction normal thereto.

Tg and Tch are both measured using conventional DSC (differential scanning colorimetry) techniques.

Unless otherwise specified, all parts, ratios, percentages, etc. are by weight.

The invention has been described in detail with particular reference to preferred embodiments thereof, but it will be understood that variations and modifications can be effected within the spirit and scope of the invention.

What is claimed is:

1. A reinforced polyester molding composition comprising
   (a) poly(ethylene terephthalate) having an I.V. of about 0.4–1.0 dl/g,
   (b) about 10–60% by weight of the composition of glass fibers,
   (c) about 1.0–5.0% by weight of the composition of at least one sodium or potassium salt of a hydrocarbon carboxylic acid of 7–25 carbon atoms or at least one sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with $Na^+$ or $K^+$ cations, and
   (d) about 0.5–10% by weight of the composition of a primary linear polymeric alcohol having the structure $CH_3(CH_2)_xCH_2OH$ where x has an average value of 28–48.

2. A composition according to claim 1 wherein said alcohol is present in an amount of about 1–5% based on the total composition weight.

3. A composition according to claim 1 wherein said sodium or potassium salt is the sodium salt of ethylene/methacrylic acid copolymer.

4. A molded article of the composition of claim 1.

* * * * *